United States Patent
Carskadon et al.

(10) Patent No.: US 10,410,489 B2
(45) Date of Patent: Sep. 10, 2019

(54) SECURITY CAMERA SYSTEM

(71) Applicant: Night Owl SP, LLC, Naples, FL (US)

(72) Inventors: Timothy Jay Carskadon, Oakland, CA (US); Craig Greenberg, Boynton Beach, FL (US); Sergio Fernandez, Naples, FL (US)

(73) Assignee: NIGHT OWL SP, LLC, Naples, FL (US)

( * ) Notice: Subject to any disclaimer, the term of this patent is extended or adjusted under 35 U.S.C. 154(b) by 197 days.

(21) Appl. No.: 15/345,307

(22) Filed: Nov. 7, 2016

(65) Prior Publication Data

US 2017/0132889 A1    May 11, 2017

Related U.S. Application Data

(60) Provisional application No. 62/251,945, filed on Nov. 6, 2015.

(51) Int. Cl.
*G08B 13/196* (2006.01)
*G06K 9/00* (2006.01)
(Continued)

(52) U.S. Cl.
CPC ... *G08B 13/19602* (2013.01); *G06K 9/00718* (2013.01); *G06K 9/00771* (2013.01);
(Continued)

(58) Field of Classification Search
None
See application file for complete search history.

(56) References Cited

U.S. PATENT DOCUMENTS

2004/0218099 A1 * 11/2004 Washington ............. H04N 5/77
                                                           348/571
2005/0185053 A1   8/2005 Berkey et al.
(Continued)

FOREIGN PATENT DOCUMENTS

WO       2003/096295 A1   11/2003
WO   WO 2003096295 A1 *  11/2003  ........... G08B 13/194

OTHER PUBLICATIONS

International Search Report received in corresponding International application No. PCT/US16/60810.

*Primary Examiner* — Dakshesh D Parikh
(74) *Attorney, Agent, or Firm* — DLA Piper LLP (US)

(57) ABSTRACT

A security camera system for safeguarding a designated area includes at least one camera for encoding and transmitting streaming video of the designated area, and a video receiver for receiving, decoding and analyzing the streaming video for relevant motion, such as movement indicative of the presence of a person. Upon detecting a motion event, the video receiver triggers an alert condition, which results in storing each video steam into memory. Each camera is provided with a PIR detector circuit for measuring infrared radiation within the designated area, the video steam and IR data being transmitted to the receiver via analog communication means to reduce implementation costs. To minimize the risk of false trigger events, the receiver monitors both pixel changes in the streaming video signals as well as measured IR radiation levels within the designated area that fall within the traditional thermal energy range of human body heat.

10 Claims, 6 Drawing Sheets

(51) Int. Cl.
   *G08B 13/19*   (2006.01)
   *H04N 5/33*   (2006.01)
   *H04N 21/61*   (2011.01)
   *G06K 9/62*   (2006.01)
   *G08B 29/18*   (2006.01)
   *H04N 7/18*   (2006.01)
   *H04N 21/438*   (2011.01)

(52) U.S. Cl.
   CPC ............ *G06K 9/6289* (2013.01); *G08B 13/19* (2013.01); *G08B 13/19669* (2013.01); *G08B 29/183* (2013.01); *H04N 5/33* (2013.01); *H04N 7/181* (2013.01); *H04N 7/188* (2013.01); *H04N 21/6125* (2013.01); *G06K 2009/00738* (2013.01); *H04N 21/4382* (2013.01)

(56) References Cited

U.S. PATENT DOCUMENTS

2012/0307066 A1   12/2012   De Ieso
2013/0215266 A1*   8/2013   Trundle ............ G08B 13/19602
                                           348/143

* cited by examiner

SECURITY CAMERA SYSTEM

FIELD OF THE INVENTION

The present invention relates generally to security camera systems and, more particularly, to security camera systems which are designed to detect the presence of relevant movement within a designated environment.

BACKGROUND OF THE INVENTION

Security camera systems, also referred to herein simply as security systems, are well known in the art and are widely used, in both residential and business settings, to monitor and safeguard a designated environment from intruders. One well-known type of security system includes at least one video surveillance camera that is connected to a common digital recording device, such as a digital video recorder (DVR) or network video recorder (NVR), by a cable or other conventional communication path. In use, each camera continuously compiles video of the monitored area and processes the video for transmission to the common video recording device. The common recording device, in turn, receives the encoded video signal compiled from each camera and decodes the signal into a corresponding digital video stream.

The two principal types of video surveillance cameras that are traditionally utilized in security systems are analog cameras and digital cameras, which are also commonly known in the art as Internet Protocol (IP) cameras. Analog and digital cameras differ primarily in that analog cameras process the compiled video signal to be transmitted to the common recording device in analog form, whereas digital cameras process the compiled video signal to be transmitted to the common recording device in digital form. As a consequence, it has been found that the two aforementioned types of video cameras differ principally in cost, with analog cameras being generally less expensive than digital cameras.

Commonly, security camera systems of the type as described above are designed to detect any relevant movement within the monitored environment, such as the presence of an individual. Upon detecting such movement within the area under surveillance, the system is designed to initiate a predefined response, such as the commencement of video recording and/or activation of an alert signal. In this manner, security camera systems serve as effective tools in safeguarding a monitored area from unauthorized intruders.

Motion detection technology is often used to detect the presence of an individual within the monitored environment. The detection of motion within the designated area is commonly achieved by examining pixel changes in the compiled digital video streams. Specifically, a central controller in the common recording device is programmed to measure pixel changes in each digital video stream. Any detected pixel change that exceeds a predefined threshold is considered a motion detection event and, as such, causes the recording device to undertake the previously determined motion detection response.

Although well-known and widely used in the art, security systems that rely solely on pixel changes to detect relevant movement within the monitored environment have been found to suffer a notable shortcoming with respect to accuracy. Specifically, it has been found that monitoring pixel changes in video streams frequently results in relatively inconsequential movement triggering a motion detection event. Examples of irrelevant action which may induce a motion detection event include, inter alia, (i) variances in light within the monitored environment (e.g., resulting from lights being turned on/off, sunlight changes and the like), (ii) movement of animals, insects, dust or other small elements within the monitored environment, and (iii) movement of elements in the background (e.g., rain, wind-induced movement of trees, shrubs or swings) or immediately outside of the monitored environment (e.g., a moving car or rain seen through a window within the designated area). As can be appreciated, this detection of inconsequential movement within the monitored environment often results in unnecessary recordings and alerts, which is highly undesirable.

In view thereof, it has become increasingly common for security systems to monitor infrared radiation variances within the designated environment, rather than monitor pixel changes in a digital video feed, in order to detect relevant movement within the area under surveillance (e.g., the presence of a person). For instance, it is known in the art for security systems to equip a digital Internet Protocol (IP) camera with a pyroelectric infrared radial (PIR) sensor circuit.

In use, the PIR sensor circuit measures infrared light that radiates from objects in its field of view (e.g., thermal energy produced from a person) in relation to the remainder of the monitored environment. The digital output signal from the PIR sensor circuit is then combined with the streaming video signal during signal processing prior to transmission to the common recording device. The recording device then analyzes the infrared radiation signal component of the mixed signal. If any thermal energy variance is detected that can be attributed to, inter alia, the standard body temperature range, the recording device initiates the predefined motion detection response. In this manner, an effective method for detecting a notable motion event within the monitored environment can be achieved.

As can be appreciated, the use of PIR sensors in security camera systems to detect relevant movement within a monitored environment has been found to suffer from a couple notable shortcomings.

As a first shortcoming, PIR sensors are traditionally used with digital camera systems due to the processing capabilities of the signal processor responsible for combining and conditioning the digital PIR output signal with the digital video stream. However, as referenced briefly above, digital cameras have been found to be relatively expensive in nature, largely due to the cost associated with the advanced signal processor as well as the signal communication channels commonly used in conjunction therewith (e.g. Ethernet cables).

As a second shortcoming, security camera systems which rely solely upon the detection of infrared radiation within a defined thermal energy range to initiate a trigger event have been found to be experience reliability issues. Specifically, it has been found that unforeseen variances in infrared radiation within the monitored environment can often be attributed to conditions other than relevant movement (e.g., the presence of people) and, as such, can induce false trigger events. Examples of non-human action which may induce a variance in infrared radiation within the designated temperature range include, inter alia, (i) rapid changes in sunlight radiation within the field of view, (ii) intense thermal energy changes caused by equipment within the monitored environment (e.g., a burner), and (iii) sun, lightning or other bright light reflecting off highly reflective surfaces (e.g., glass or a pool) toward the PIR sensor.

SUMMARY OF THE INVENTION

It is an object of the invention to provide a new and improved security camera system for monitoring a designated environment.

It is another object of the present invention to provide a security camera system as described above that monitors the designated environment using one or more continuous video streams.

It is yet another object of the present invention to provide a security camera system as described above that records the one or more continuous video streams upon detecting relevant movement within the designated environment.

It is still another object of the present invention to provide a security camera system as described above that detects relevant movement within the designated environment with reliable accuracy.

It is yet still another object of the present invention to provide a security camera system as described above that is simple to use, readily scalable in size, and inexpensive to implement.

Accordingly, as one feature of the present invention, there is provided a security camera system for monitoring a designated area for relevant movement, the security system comprising (a) an analog video transmitter, comprising, (i) an image capture device for producing a streaming digital video signal of the designated area, (ii) a PIR detector circuit for measuring infrared radiation within the designated area, the PIR detector circuit producing a digital infrared radiation signal that indicates relevant movement within the designated area based on measured infrared radiation, and (iii) a signal processor for processing the digital video and infrared radiation signals together to yield a mixed analog signal, the signal processor transmitting the mixed analog signal, and (b) a video receiver adapted to receive and decode the mixed analog signal transmitted from the analog video transmitter into a corresponding decoded digital signal, the video receiver analyzing the decoded digital signal and triggering an alert condition when the decoded digital signal indicates relevant movement within the designated area.

As another feature of the present invention, there is provided a security camera system for monitoring a designated area for relevant movement, the security system comprising (a) a video transmitter, comprising, (i) an image capture device for producing a streaming digital video signal of the designated area, (ii) a PIR detector circuit for measuring infrared radiation within the designated area, the PIR detector circuit producing a digital infrared radiation signal that indicates relevant movement within the designated area based on measured infrared radiation, and (iii) a signal processor for processing the digital video and infrared radiation signals together to yield a mixed signal, the signal processor transmitting the mixed signal, and (b) a video receiver adapted to receive and decode the mixed signal transmitted from the video transmitter into a corresponding decoded digital signal with multiple image frames, each image frame comprising a plurality of pixels, the video receiver detecting a number of pixel changes between successive image frames in the decoded digital signal, (c) wherein the video receiver analyzes the decoded digital signal and triggers an alert condition only when both the amount of measured infrared radiation and the number of detected pixel changes in the decoded digital signal indicates relevant movement within the designated area.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE INVENTION

Security Camera System 11

Figure 1:
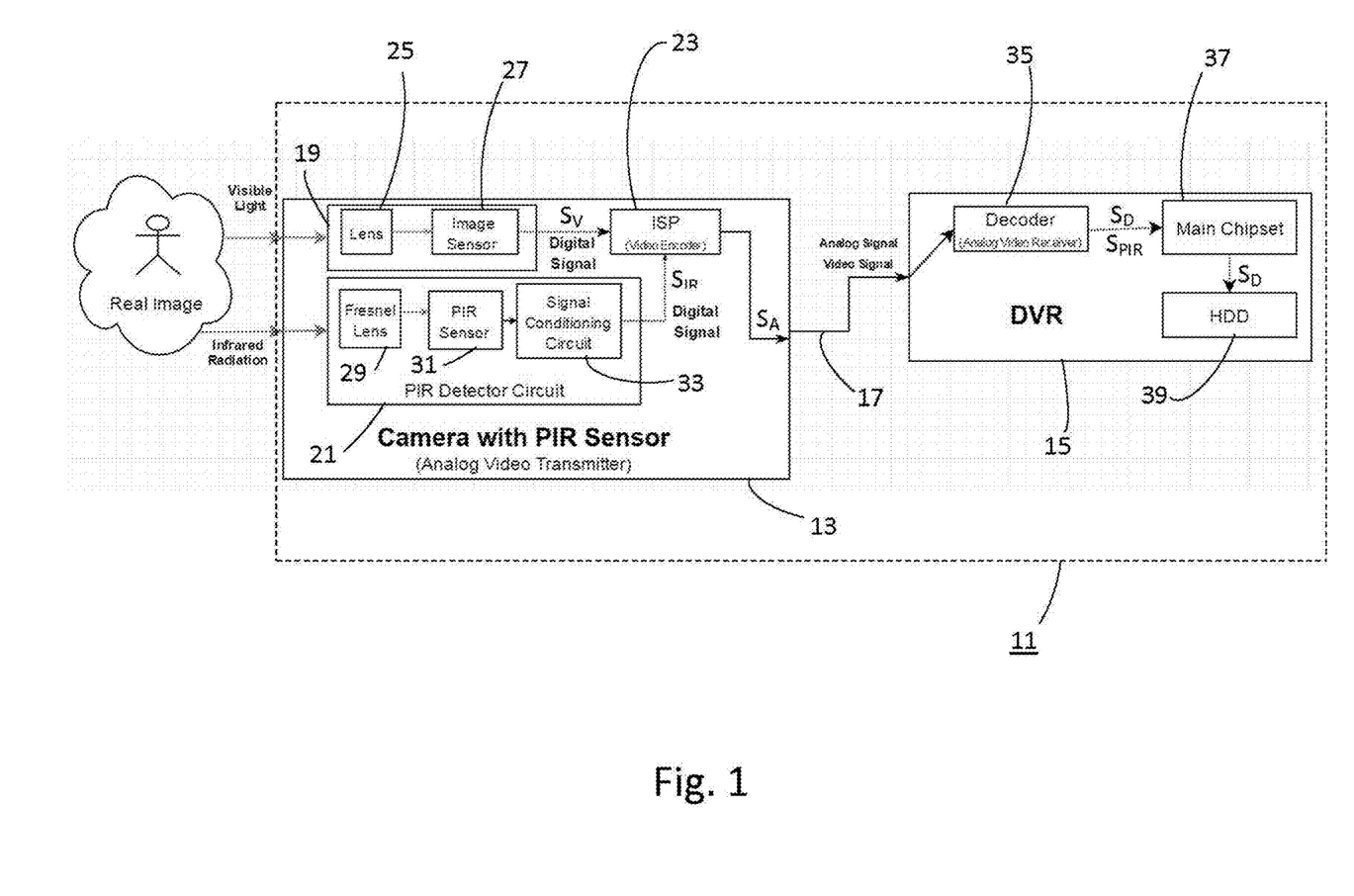
FIG. 1 is a simplified block representation of a security camera system constructed according to the teachings of the present invention, the system being shown with a simplified representation of person present within a monitored environment.

Referring now to FIG. 1, there is shown a security camera system constructed in accordance with the teachings of the present invention, the security camera system being identified generally by reference numeral 11. As will be explained further in detail below, security camera system 11 is designed to provide video surveillance of a particular environment. As a primary feature of the present invention, system 11 is able to detect relevant movement within the monitored environment (e.g., the presence of an individual) with great accuracy and at minimal cost to implement.

Security camera system 11 comprises at least one video transmitter, or camera, 13 that is connected to a common video receiver, or recorder, 15 by an appropriate communication channel 17. For simplicity purposes only, system 11 is represented herein as comprising a single camera 13. However, it is to be understood that a plurality of cameras 13 could be connected to common receiver 15 via corresponding communication channels 17 without departing from the spirit of the present invention. In this capacity, surveillance could be achieved over a larger environment and/or with greater overall effectiveness.

In use, each camera 13 is designed to continuously compile video of the monitored environment. The video signal is then transmitted via channel 17 to video receiver 15 for analysis. If receiver 15 determines that a relevant motion event has taken place within the monitored environment, receiver 15 initiates a predefined alert response, such as commencing recording of the video feed into a data storage device and/or activating an alert signal.

As will be explained in greater detail below, system 11 is provided with two novel design features, each of which offers notable advantages over conventional security camera systems. Specifically, system 11 is designed to (i) utilize both infrared (IR) radiation-based motion detection technology and pixel-based motion detection technology to determine relevant movement within the monitored environment, thereby minimizing the frequency of false alert triggers and improving overall accuracy, and (ii) operate as an analog system, with the temperature detection signal and the video signal compiled by camera 13 being processed into a mixed analog signal that is transmitted to receiver 15 via analog-based communication channel 17, thereby offering considerable cost savings to implement.

As seen in FIG. 1, each camera 13 comprises an optical system, or image capture device, 19 that produces a digital video signal Sy, a PIR detector circuit 21 that produces a digital IR radiation signal $S_{IR}$, and an image signal processor, or ISP, 23 that processes the digital video signal $S_V$ and digital IR radiation signal $S_{IR}$ together to yield a combined, or mixed, analog signal $S_A$. As referenced briefly above, incorporating IR radiation detection technology into an analog security camera system serves to ensure detection accuracy while minimizing implementation costs, which is highly desirable.

Optical system 19 preferably includes an optical lens 25, which captures visible light in its field of view within the monitored environment, and an image sensor 27 that converts the visible light captured by lens 25 into a corresponding digital video signal $S_V$. As seen, image sensor 27 is in electrical communication with ISP 23. As a result, digital video signal $S_V$ produced from optical system 19 is streamed to ISP 23 for subsequent processing.

PIR detector circuit 21 preferably includes a Fresnel lens 29, which refracts all light in its field of view within the monitored environment, a PIR sensor 31, which converts any infrared (IR) radiation from the refracted light into a corresponding voltage, and a signal conditioning circuit 33 that converts the voltage produced by PIR sensor 31 into a corresponding digital IR radiation signal $S_{IR}$. As can be seen, signal conditioning circuit 33 is in electrical communication with ISP 23. As a result, digital IR radiation signal $S_{IR}$ produced from circuit 33 is delivered to ISP 23 for processing.

As can be appreciated, signal conditioning circuit 33 preferably includes a microcontroller that is specifically tuned to monitor a particular IR radiation range within the field of view (namely, the corresponding thermal energy range which is indicative of the presence of a person). Based on the voltage produced by PIR sensor 31, circuit 33 produces a series of intermittent yes/no-type temperature signals $S_{IR}$, with a "yes" signal denoting that a trigger condition has been met (e.g., a thermal energy variance within the field of view which is indicative of the presence of a person) and a "no" signal denoting that a trigger condition has not been met.

Preferably, signal conditioning circuit 33 compares two sensor readings (e.g., by analyzing the outputs of a pair of separate PIR sensors 31) to obtain IR radiation differentials within the field of view. Using this technique, the average, or natural, temperature within the field of view is effectively normalized. Among other things, this technique further enables circuit 33 to compensate for (ii) broader changes throughout the entire field of view that may be attributable to lighting and/or temperature changes within the monitored environment and (ii) common-mode interference that may be attributable to nearby electric fields.

Although separate complementary pairs of lenses and sensors are used to produce corresponding video and temperature signals, it is to be understood that the same lens and/or sensor could be used in conjunction with the production of both video signal $S_V$ and IR radiation signal $S_{IR}$. By eliminating such components, camera 13 may be effectively reduced in both size and cost of manufacture.

As referenced briefly above, image signal processor, or controller, 23 is disposed in electronic communication with optical system 19 and PIR detector circuit 21. Processor 23 is specifically programmed to condition and mix digital video signal Sy and digital IR radiation signal $S_{IR}$ to yield combined analog signal $S_A$. In turn, encoded analog signal $S_A$ is transmitted to video receiver 15 via communication channel 17 for subsequent decoding and analysis, which will be explained further below.

It should be noted that utilizing an analog signal format to transmit signals from each camera 13 to receiver 15 provides system 11 with a couple notable advantages.

As a first advantage, because analog signal transmission protocols are rather limited in complexity, controller 23 requires minimal processing capabilities. Consequently, a relatively inexpensive controller 23 could be utilized in each camera 13, thereby significantly reducing the overall cost to manufacture system 11.

As a second advantage, analog signal transmission allows for the use of analog communication channels 17, which are often already configured in certain environments. As can be appreciated, analog communication mediums, such as coaxial cables, are both generally inexpensive in nature and can be relatively long in length without experiencing signal degradation.

ISP 23 utilizes a novel method of conditioning and mixing digital video signal $S_V$ and digital IR radiation signal $S_{IR}$ together to yield combined analog signal $S_A$. As will be explained further in detail below, signal mixing is achieved by taking advantage of inherent constructs of certain analog video transmission protocols.

Specifically, certain analog signal transmission protocols (e.g., National Television System Committee (NTSC) and Phase Altering Line (PAL) transmission protocols) transmit video in a frame-by-frame manner. In the present invention, ISP 23 is able to combine streaming digital video signal $S_V$ with PIR sensor signal $S_{IR}$ by inserting the IR radiation data in the space between successive frames of the video during conversion into analog form.

Figure 2:
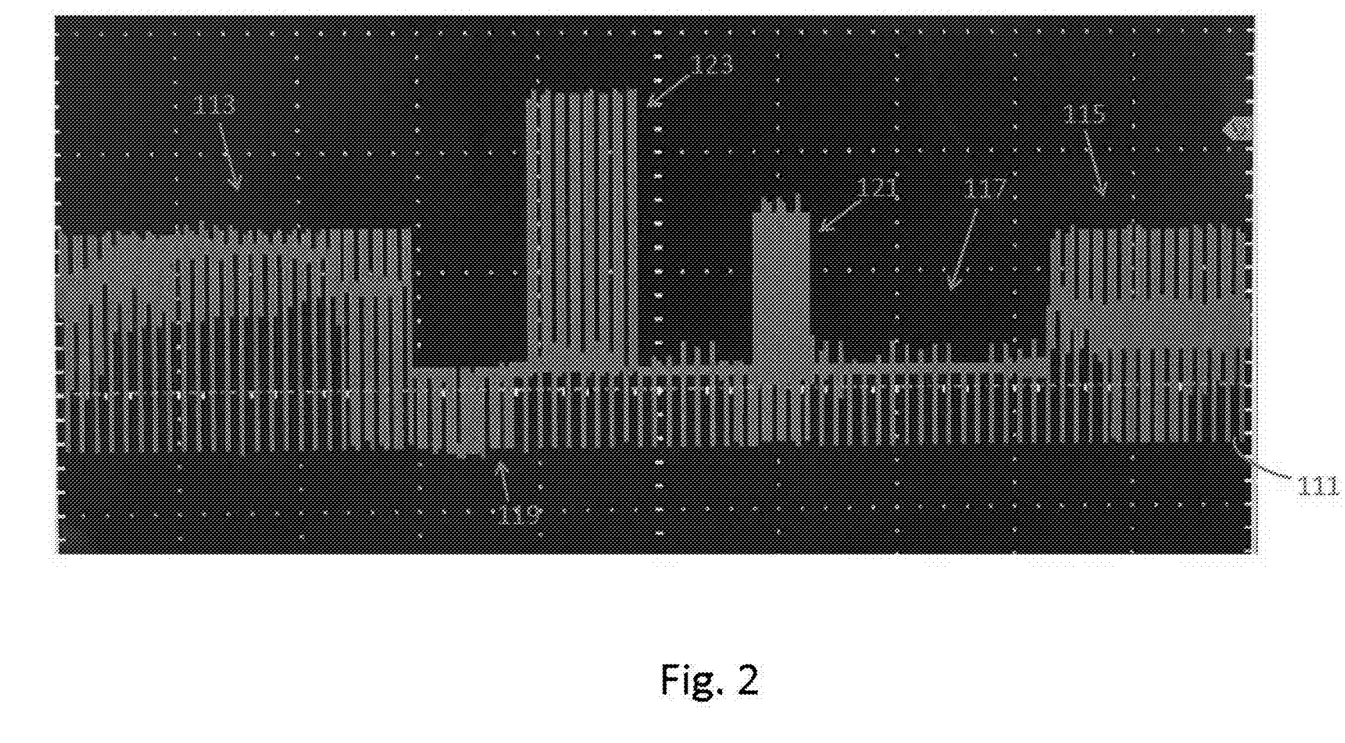
FIG. 2 is a sample signal waveform of the mixed analog signal transmitted by the camera shown in FIG. 1.

To illustrate the signal mixing concept set forth in detail above, a sample signal waveform is shown in FIG. 2, the waveform being identified generally by reference numeral 111. As can be seen, sample waveform 111 includes a first set, or frame, of active lines of video 113 and a second set, or frame, of active lines of video 115 that are separated by a vertical blanking interval (VBI) 117. A limited portion of interval 117 includes certain non-visible data used for video synchronization and equalization purposes. For instance, in waveform 111, a portion of interval 117 includes vertical synchronization pulses 119, which are used to indicate when the next successive frame of video is to commence, and color synchronization carriers 121.

As can be seen, PIR signal data, or component, 123 is embedded into waveform 111 within interval 117. As previously referenced, PIR signal component 123 is preferably of the yes/no variety, generating one or more pulses of a first amplitude upon detecting a "yes" condition and one or more pulses of a second amplitude upon detecting a "no" condition. In this manner, video receiver 15 is easily able to discern when a IR radiation alert condition has occurred, as will be explained further below.

Figure 3A:
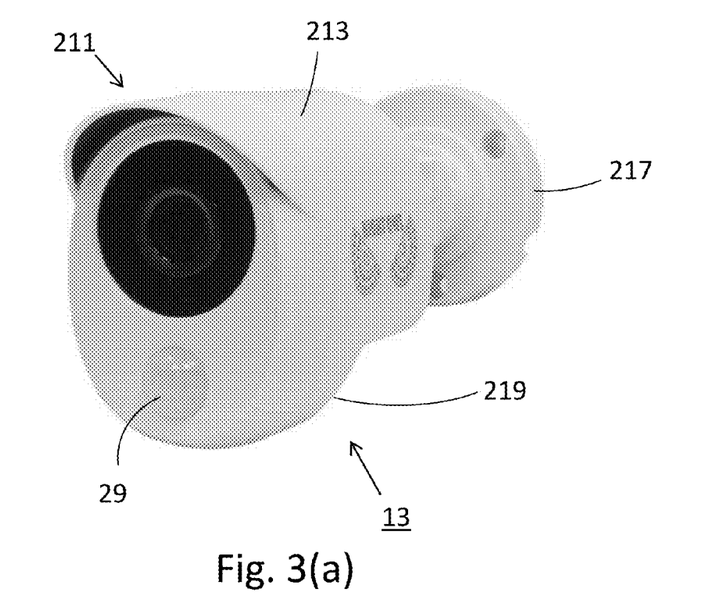
FIGS. 3(a) and 3(b) are front perspective and partially exploded side views, respectively, of one implementation of the camera shown in FIG. 1.
Figure 3B:
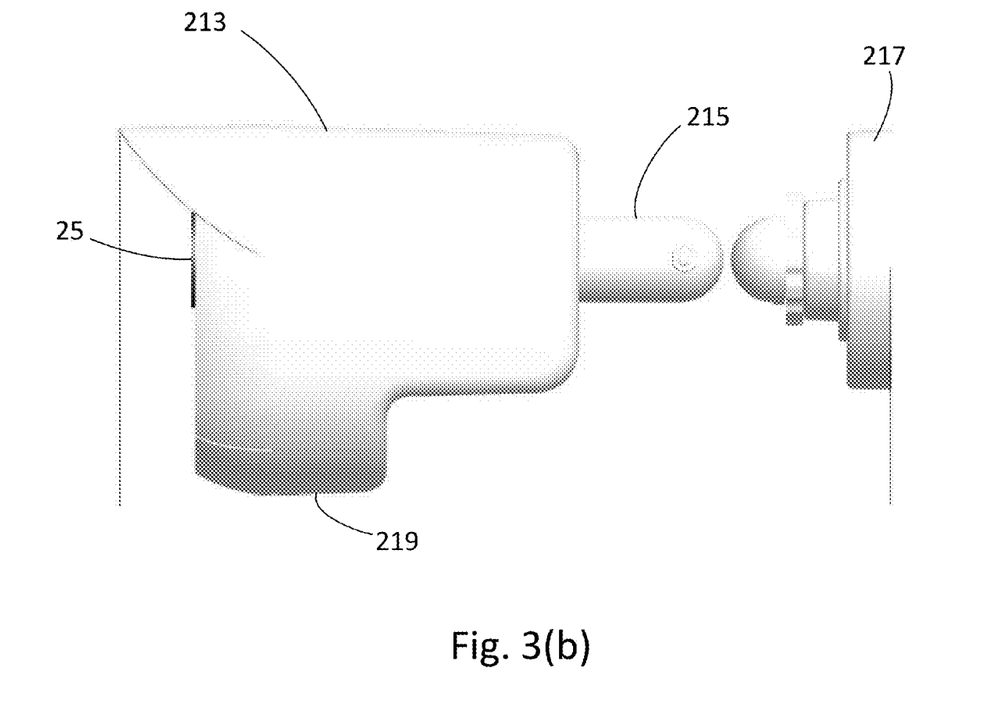

Referring now to FIGS. 3(a) and 3(b), there are shown front perspective and side views, respectively, of one implementation of camera 13. However, it is to be understood that the implementation of camera 13 shown in FIGS. 3(a) and 3(b) is provided for illustrative purposes only and that the overall design and configuration of camera 13 could be modified without departing from the spirit of the present invention.

As represented herein, camera 13 comprises a common protective housing 211 into which all the principal electronic components of camera 13 are disposed in order to create a unitary item. Specifically, housing 211 includes a generally cylindrical member, or canister, 213 that is appropriately dimensioned to retain optical system 19, detector circuit 21 and signal processor 23.

A stem 215 extends orthogonally out from the rear of canister 213 and is pivotally coupled to a dome-shaped base 217, which is designed to be fixedly mounted onto a wall or other similar surface. As such, the orientation of canister 213 can be adjusted, as needed, relative to base 217 to modify the field of view for camera 13.

In the present embodiment, both optical system 19 and PIR detector circuit 21 are shown retained within canister 213. To facilitate assembly of camera 13, canister 213 is designed with a narrow extension, or bump-out, 219 to receive PIR detector circuit 21 without interfering with the larger components of camera 13.

Referring back to FIG. 1, video receiver 15 represents any device capable of receiving, analyzing and selectively recording video, such as a DVR or NVR. As can be seen, receiver 15 preferably includes a decoder 35 for, inter alia, decoding analog signal $S_A$ back into digital form, a main chipset, or microcontroller unit (MCU), 37 for, inter alia, determining when thermal-based and pixel-based motion detection exceeds a defined threshold, and a data storage device 39 for saving digital video signal $S_D$ when MCU 37 determines a motion detection event.

Decoder 35 represents any device capable of receiving and decoding an analog signal into digital form. As can be appreciated, decoder 35 receives the analog video signal from each camera 13 and, in turn, is responsible for both (i) decoding the video component of processed analog signal $S_A$ back into a corresponding digital video signal $S_D$ and (ii) generating a digital PIR flag signal $S_{PIR}$ which indicates the yes/no status of the embedded PIR signal component in analog signal $S_A$.

MCU 37 is in electrical communication with decoder 35 and is adapted to receive both digital video signal $S_D$ and digital PIR flag signal $S_{PIR}$. Using the aforementioned digital signals, MCU engages in three principal processes, namely, (i) analyzing pixel changes in digital video signal $S_D$ to determine whether a pixel-based motion detection event has occurred, (ii) analyzing the status of digital PIR flag signal $S_{PIR}$ to determine whether a thermal-based motion detection event has occurred, and (iii) if both thermal-based and pixel-based motion detection is determined, initiating the predefined alert response (e.g. commence storing of video signal $S_D$ into memory).

Preferably, pixel detection is achieved by programming MCU 37 to analyze frames of digital video signal $S_D$, wherein each video frame is an image which contains a matrix of pixels. Because each pixel is assigned a value which determines its color, a motion detection algorithm can be applied by MCU 37 that compares the value of each pixel on a frame-by-frame basis to detect change. If pixel change is detected which exceeds a predefined threshold (e.g., amongst a certain minimum-sized pixel cluster), a pixel-based motion detection event is assessed.

Storage device 39 is electrically connected to MCU 37 and is adapted to receive and store video signal $S_D$ into memory. Accordingly, storage device 39 represents any device capable of storing video, such as a local hard disk drive (HDD). Although storage device 39 is represented herein as being an internal component of receiver 15, it is to be understood that storage device 39 could be remotely located (e.g., a cloud-based data storage solution) without departing from the spirit of the present invention.

As referenced above, communication channel 17 represents any conventional communication medium that is capable of transmitting an analog signal. For instance, channel 17 may be in the form of a length of relatively inexpensive, analog coaxial cable that directly connects each camera 13 to common receiver 15. Alternatively, channel 17 may be in the form of a wireless communication path, thereby facilitating the installation of cameras 13.

Operation of Security Camera System 11

Security camera system 11 is designed to operate in the following manner. As referenced above, each camera 13 is designed to compile a continuous stream of digital video $S_V$ for the monitored environment. Additionally, each camera 13 measures IR light within the monitored environment, thereby allowing for the detection of any change in IR radiation within the environment that is indicative of relevant movement, such as a change in thermal energy attributable to body heat.

Signal processor 23 then mixes digital video signal Sy and digital IR radiation signal $S_{IR}$ together to yield a combined analog signal $S_A$. As a feature of the invention, ISP 23 can process each of the aforementioned digital signals using different analog transmission protocols. Accordingly, it is to be understood that the principles of the present invention could be applied or retrofitted across a broad spectrum of digital and analog security camera systems, which is highly desirable.

Mixed analog signal $S_A$ from each camera 13 is then transmitted in analog form to common receiver 15 via analog communication medium 15. As can be appreciated, the use of analog signal transmission technology substantially reduces the manufacturing cost associated with system 11, which is highly desirable.

Upon receipt of combined analog signal $S_A$, receiver 15 decodes the video steam back into digital form and engages in an analysis to determine whether both IR radiation-based and pixel-based motion detection has occurred within the monitored environment. For ease in understanding how video receiver 15 engages in its motion detection analysis, a series of illustrative screen displays are shown in FIGS. 4(a)-(c).

Figure 4A:
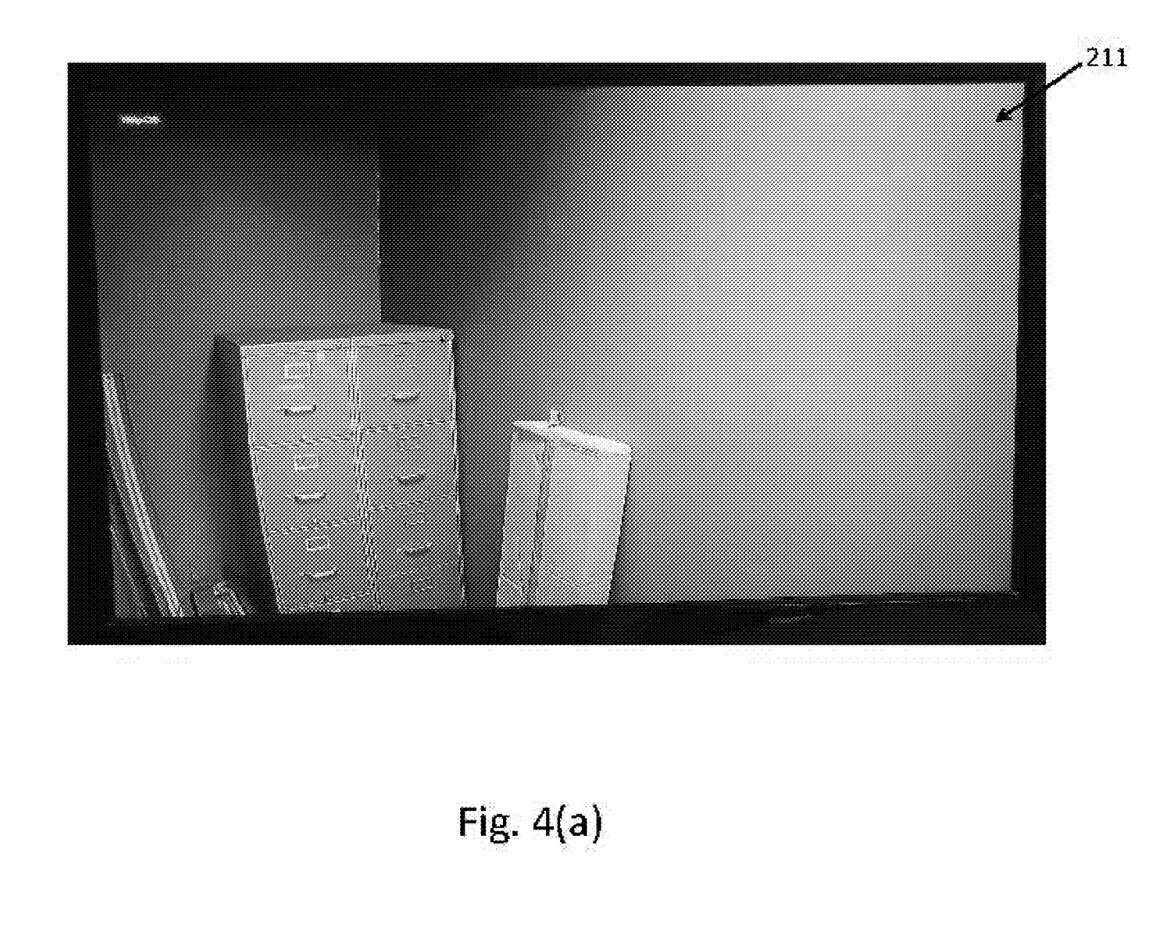
FIGS. 4(a)-(c) are a series of sample frames of the analog video stream produced by the camera shown in FIG. 1, the sample video frames being useful in illustrating how security camera system detects and determines a relevant motion event, wherein a portion of each sample frame in FIGS. 4(b) and 4(c) is shown enlarged and exploded therefrom as an inset.

In FIG. 4(a), there is shown a sample screen display, or video frame, 211 of a digital video stream $S_D$ compiled and analyzed by video receiver 15. As can be seen, frame 211 of video stream $S_D$ is shown at a moment in time in which there is no motion detected within the monitored environment, which is represented herein as an office.

Figure 4B:
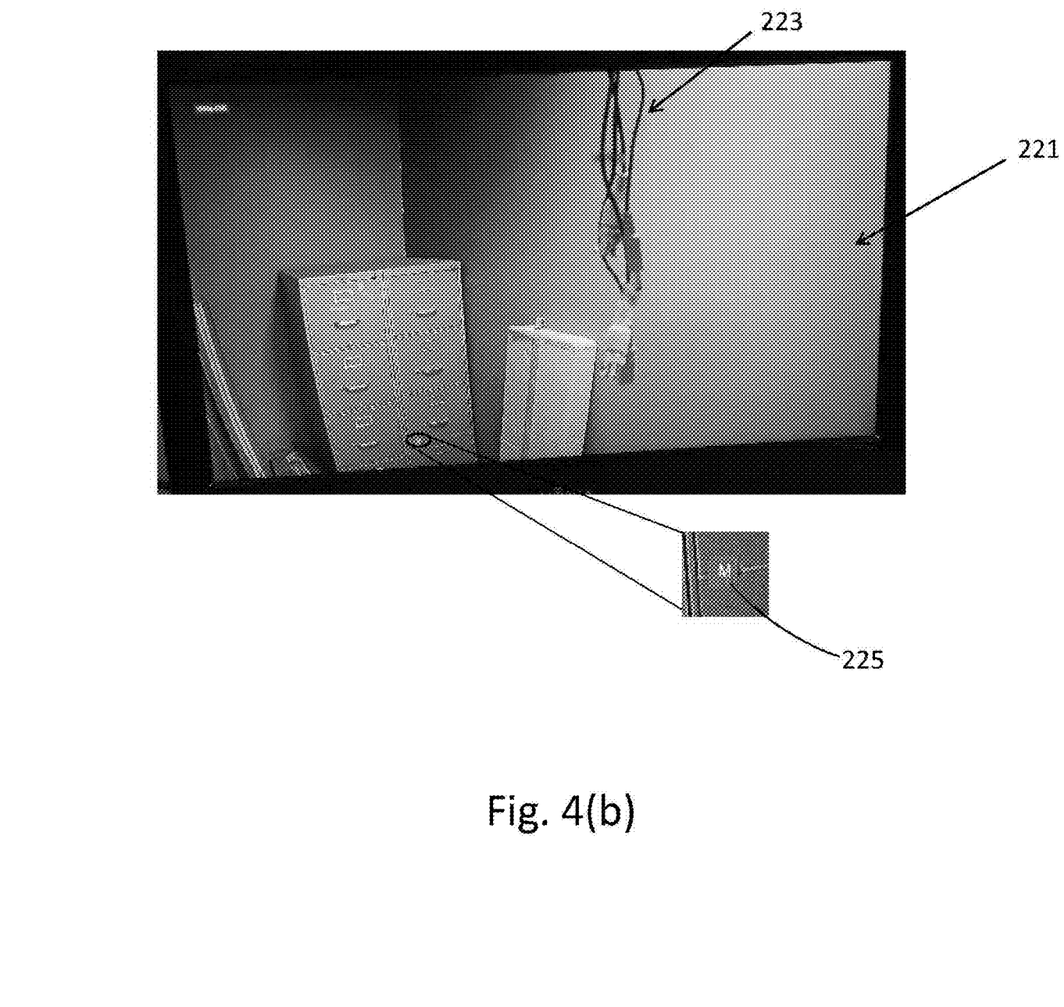
Figure 4C:
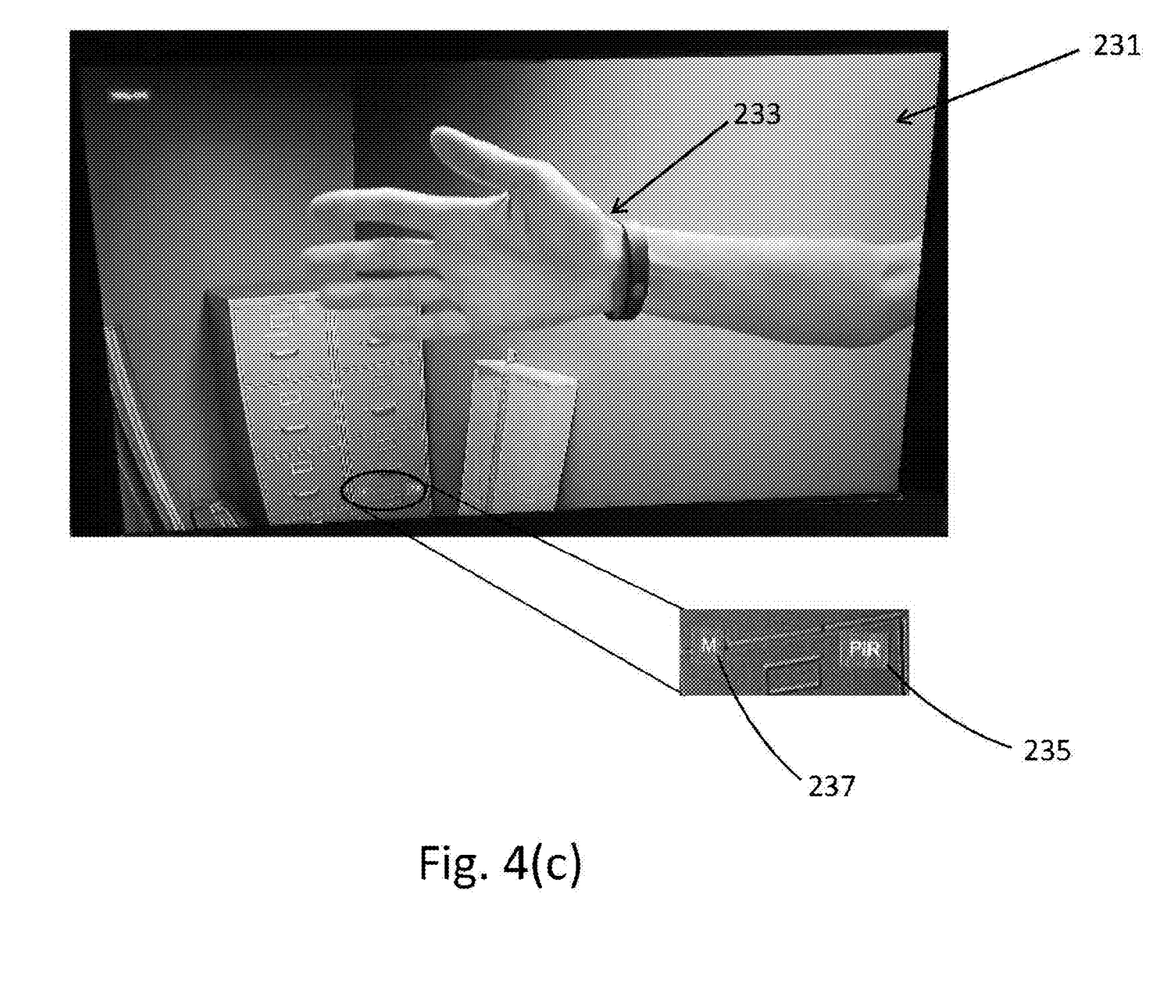

By contrast, in FIG. 4(b), there is shown a second sample screen display, or video frame, 221 of a digital video stream $S_D$ compiled and analyzed by video receiver 15. As can be seen, a plurality of cables 223 has fallen into the field of view. Because receiver 15 monitors pixel changes in the video feed, the pixel changes attributed to the movement of cables 223 triggers a pixel-based motion detection motion event. Upon detecting the pixel-based motion detection event, MCU marks video stream $S_D$ with a corresponding tag 225, represented herein simply as the letter "M."

It should be noted that the presence of cables 223 does not similarly induce a thermal energy-based motion detection event because no notable change in infrared radiation is detected within the field of view (e.g., thermal energy falling within the typical range of human body heat). Because no relevant, thermal-based movement is detected within the field of view, the pixel-based detection event motion is considered inconsequential (e.g., not a human intrusion) and, as such, no alert response is undertaken.

However, in FIG. 4(c), there is shown a third sample screen display, or video frame, 231 of a digital video stream $S_D$ compiled and analyzed by video receiver 15. As can be seen, a hand 233 is present within the field of view. The thermal radiation produced from hand 233 is detected by PIR detector circuit 21 and, in turn, yields an indicative digital PIR signal $S_{IR}$. Receiver 15 ultimately identifies that a IR radiation-based motion detection event has occurred and marks video stream $S_D$ with a corresponding tag 235, represented herein simply as "PIR."

Additionally, by monitoring pixel changes in the video feed, the initial movement of hand 233 within the field of view triggers a pixel-based motion detection event. Upon detecting the pixel-based motion detection event, MCU marks video stream $S_D$ with a corresponding tag 237, represented herein simply as the letter "M."

It should be noted that if both IR radiation-based and pixel-based motion detection events are detected, video receiver 15 engages in an appropriate alert response, such as commencing storage of the video feed $S_D$ into data storage device 39. However, it is to be understood that the triggering of an alert response is only undertaken when both types of events are detected, thereby eliminating frequent false trigger events that generally occur when only one of the two events is detected.

Features and Advantages of the Present Invention

As can be appreciated, the construction and operation of security camera system 11 yields a number of notable advantages over traditional security camera systems.

As a first advantage, security camera system 11 incorporates IR radiation-based motion detection capabilities into an analog-based security camera system. Due to certain inherent positive characteristics associated with analog-based signal transmission systems (e.g., lower costs, longer signal transmission capabilities), a highly advantageous security camera system can be achieved.

As a second advantage, security camera system 11 utilizes IR radiation-based and pixel-based motion detection, in tandem, to increase the accuracy in sensing relevant movement, such as the presence of a person within a monitored environment. In fact, testing indicates that the use of the two aforementioned motion detection techniques can diminish the occurrence of false trigger events by as much as 90%.

The embodiment shown above is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A security camera system for monitoring a designated area for relevant movement, the security system comprising:
    (a) an analog video transmitter, comprising,
        (i) an image capture device for producing a streaming digital video signal of the designated area,
        (ii) a PIR detector circuit for measuring infrared radiation within the designated area, the PIR detector circuit producing a digital infrared radiation signal that indicates relevant movement within the designated area based on measured infrared radiation, and
        (iii) a signal processor for processing the digital video and infrared radiation signals together to yield a mixed analog signal containing a video signal component that includes a video stream and a PIR signal component, the signal processor transmitting the mixed analog signal; and
    (b) a video receiver adapted to receive and decode the mixed analog signal transmitted from the analog video transmitter into a corresponding decoded digital signal, the video receiver analyzing the decoded digital signal and triggering an alert condition when the decoded digital signal indicates relevant movement within the designated area.

2. The security camera system of claim 1 wherein the video receiver comprises:
    (a) a decoder for decoding the mixed analog signal into a corresponding decoded digital signal that includes a digital video signal component and a digital PIR signal component; and
    (b) a microcontroller unit for analyzing the digital PIR signal component to determine the presence of an alert condition.

3. The security camera system of claim 2 wherein, upon determining an alert condition, the video receiver initiates a predefined alert response.

4. The security camera system of claim 3 wherein the video receiver further comprises a data storage device.

5. The security camera system of claim 4 wherein, as the predefined alert response, the microcontroller unit stores the digital video signal component of the decoded digital signal in the data storage device.

6. The security camera system of claim 1 wherein PIR detector circuit comprises:
    (a) a lens for refracting light within the designated area;
    (b) a PIR sensor for converting infrared radiation in the light refracted by the lens into a corresponding voltage; and
    (c) a signal conditioning circuit for comparing the voltage produced by the PIR sensor against a predefined voltage range, the signal conditioning circuit generating a digital infrared radiation signal indicative of an alert condition when the voltage produced by the PIR sensor falls within the predefined voltage range.

7. A security camera system for monitoring a designated area for relevant movement, the security system comprising:
    (a) an analog video transmitter, comprising,
        (i) an image capture device for producing a streaming digital video signal of the designated area,
        (ii) a PIR detector circuit for measuring infrared radiation within the designated area, the PIR detector circuit producing a digital infrared radiation signal that indicates relevant movement within the designated area based on measured infrared radiation, and
        (iii) a signal processor for processing the digital video and infrared radiation signals together to yield a mixed analog signal, the signal processor transmitting the mixed analog signal; and
    (b) a video receiver adapted to receive and decode the mixed analog signal transmitted from the analog video transmitter into a corresponding decoded digital signal, the video receiver analyzing the decoded digital signal and triggering an alert condition when the decoded digital signal indicates relevant movement within the designated area;

wherein the signal processor encodes the digital video signal into a corresponding analog signal that includes at least two image frames, the signal processor inserting data corresponding to the digital infrared radiation signal between the at least two image frames.

8. The security camera system of claim 1 wherein the signal processor transmits the mixed analog signal to the video receiver via an analog communication channel.

9. The security camera system of claim 8 wherein the analog communication channel is in the form of a single coaxial cable.

10. The security camera system of claim 1 wherein the video receiver comprises:
  (a) a decoder for decoding the mixed analog signal into a corresponding decoded digital signal that includes a digital video signal component and a digital PIR signal component; and
  (b) a microcontroller unit for analyzing the digital video signal component and the digital PIR signal component to determine the presence of an alert condition when both the digital video signal component and the digital PIR signal are indicative of detected motion.

\* \* \* \* \*